United States Patent [19]

Saiki et al.

[11] Patent Number: 5,384,184
[45] Date of Patent: Jan. 24, 1995

[54] POLYESTER BLOCK COPOLYMER AND ELASTIC YARN COMPOSED THEREOF

[75] Inventors: Noritsugu Saiki; Toshitsugu Matsuki; Masayuki Hayashi, all of Matsuyama, Japan

[73] Assignee: Teijin Limited, Osaka, Japan

[21] Appl. No.: 128,314

[22] Filed: Sep. 28, 1993

Related U.S. Application Data

[63] Continuation of Ser. No. 797,138, Nov. 22, 1991, abandoned.

[51] Int. Cl.$^6$ ............... D03D 15/08; C08G 63/688
[52] U.S. Cl. ............... 428/230; 428/224; 525/89; 525/94; 528/272; 528/287; 528/295; 528/302; 528/308; 528/308.6
[58] Field of Search ............... 428/224, 230; 525/89, 525/94; 528/272, 287, 295, 302, 308, 308.6

[56] References Cited

U.S. PATENT DOCUMENTS

| Re. 32,741 | 8/1988 | Miyoshi et al. | 528/295 |
|---|---|---|---|
| 2,691,006 | 10/1954 | Flory | 525/444 |
| 3,037,960 | 6/1962 | Frager | 528/194 |
| 3,446,778 | 5/1969 | Naller et al. | 525/444 |
| 3,732,183 | 5/1973 | Popp et al. | 528/287 |
| 4,006,123 | 2/1977 | Samuelson et al. | 528/287 |
| 4,031,165 | 6/1977 | Saiki et al. | 525/444 |
| 4,070,417 | 1/1978 | Isaka et al. | 525/444 |
| 4,377,682 | 3/1983 | Ohguchi et al. | 528/301 |
| 4,851,504 | 7/1989 | Suzuki et al. | 528/287 |

FOREIGN PATENT DOCUMENTS

| 1911034 | 9/1969 | Denmark . |
|---|---|---|
| 2114236 | 5/1972 | Denmark . |
| 0280026 | 8/1988 | Denmark . |
| 2197033 | 3/1974 | France . |

OTHER PUBLICATIONS

Patent Abstracts of Japan, vol. 7, No. 235 (C-191) (1380) 19 Oct. 1983 & JP-A-58 126 314 (Teijin KK) 27 Jul. 1983.

*Primary Examiner*—Samuel A. Acquah
*Attorney, Agent, or Firm*—Burgess, Ryan & Wayne

[57] ABSTRACT

A polyester block copolymer having an inherent viscosity of at least 0.6, which comprises (A) 30 to 90% by weight of polyester segments comprising a benzenedicarboxylic acid as the main acid component and a diol having 5 to 12 carbon atoms between the hydroxyl groups as the main glycol component and (B) 70 to 10% by weight of polyester segments comprising an aromatic dicarboxylic acid as the main acid component and ethylene glycol, trimethylene glycol, tetramethylene glycol or 1,4-cyclohexane dimethanol as the main glycol component, wherein (i) when a polyester having an inherent viscosity of at least 0.6 is formed by polycondensation of the components constituting the polyester segments (A), the melting point of the obtained polyester is lower than 50° C. or the obtained polyester is amorphous, and (ii) when a polyester having an inherent viscosity of at least 0.6 is formed by polycondensation of the components constituting the polyester segments (B), the melting point of the polyester is higher than 180° C. This polyester block copolymer provides an elastic yarn having a high elastic recovery and a high heat resistance.

11 Claims, No Drawings

POLYESTER BLOCK COPOLYMER AND ELASTIC YARN COMPOSED THEREOF

This a continuation of Ser. No. 07/797,138 filed Nov. 22, 1991, now abandoned.

BACKGROUND OF THE INVENTION

(1) Field of the Invention

The present invention relates to a novel polyester block copolymer and an elastic yarn composed thereof. More particularly, the present invention relates to a polyester-polyester block copolymer having an excellent elastic recovery performance and a high light resistance and chlorine resistance, and an elastic yarn formed by using this block copolymer.

(2) Description of the Related Art

It is known that a polyester block copolymer is now used as a molding resin, as an elastomer characterized by a thermoplastic property, and this polyester elastomer consists of two kinds; i.e., a polyether ester block copolymer and a polyester ester block copolymer.

The polyether ester block copolymer comprises an aliphatic polyether such as polytetramethylene glycol and an aromatic polyester such as polybutylene terephthalate. This polymer is thermoplastic and has a high crystallization speed and a high heat resistance, and therefore, is widely used. Nevertheless, this polymer is defective in that its resistance to oxidative reaction is very low. For example, if this polymer is prepared and molded in the absence of a stabilizer, the surface becomes slippery and cracking occurs within less than several months. Namely, this polymer cannot be practically used without the aid of a stabilizer.

The addition of a stabilizer, however, gives rise to various problems; for example, if a molded body maintained at a high temperature is cooled, the stabilizer bleeds out to the surface and the molded body often appears to be fogged, which reduces its commercial value. Furthermore, if the molded body is used in the presence of $NO_x$, a yellowing thereof sometimes occurs, and again, its commercial value is reduced. Moreover, it is obvious that, in medicinal application, the presence of a stabilizer that is easily extracted is not preferable.

A block copolymer comprising an aliphatic polyester and an aromatic polyester such as polybutylene terephthalate is known as the polyester ester block copolymer. The oxidation resistance of this polymer is higher than that of the polyether ester copolymer, but the polymer is defective in that the hydrolysis resistance is poor. Since there is no stabilizer able to improve the hydrolysis resistance, although a stabilizer able to improve the oxidation resistance is known, it has been considered difficult to improve the hydrolysis resistance. Further, although the oxidation resistance of the polymer is higher than that of the polyether ester copolymer, the oxidation resistance is still unsatisfactory, and thus a stabilizer must be used.

A spandex yarn has been used as an elastic yarn because it has an excellent elastic recovery performance, and an elastic yarn composed of a polyester block copolymer has been used recently only in restricted application fields. The spandex yarn, however, is defective in that, because of a poor wet heat resistance, a mixed fabric of the spandex yarn with a polyester fiber is difficult to dye, a yellowing thereof readily occurs under an irradiation with light, and the spandex yarn is unsatisfactorily used for swimming wear or the like because it has a poor chlorine resistance. Therefore, a practical use of the spandex yarn is very limited.

To overcome these defects, various investigations have been made into the preparing of an elastic yarn by using the above-mentioned polyester block copolymer, but only an elastic yarn composed of a polyether ester copolymer having an improved wet heat resistance has been put to practical use. This is because all of the obtained elastic yarns have an inferior spandex performance, especially a poor elastic recovery, but if this defect is overcome, the excellent properties of the polyester block copolymer will be come available and an elastic yarn free of the defects of a spandex yarn will be obtained.

The properties of the elastic yarn, such as light resistance and chlorine resistance, are substantially determined by the kind of soft segment, and therefore, a novel soft segment different from that of the spandex yarn is required.

The heretofore investigated polyester ester block copolymer comprising a polyester as the soft segment has not been put to practical use as a fiber, because the preparation of the polymer per se is difficult and the performance of the elastic yarn is still poor, and even if characteristics are manifested by the formation of the polymer, the defects are also clearly manifested and this hinders a practical use thereof. For example, the specification of U.S. Pat. No. 3,037,960 discloses a polyester block copolymer comprising a polyester having a melting point lower than 50° C. and a polyester having a melting point higher than 200° C., and represented by the formula of —(R'COOROCO) (where —R— represents an aromatic diol residue). In this U.S. patent specification it is taught that the block copolymer is superior to the spandex yarn in color stability, light stability, and oxidative stability, and is superior to a polyether in oxidative stability. Although almost 30 years have passed since the issuance of this U.S. patent, the block copolymer has not been practically used. The reason for this is construed, from examples of the patent specification, to be that (1) the hydrolysis resistance is poor, (2) the tensile recovery is lower than that of the spandex yarn, and (3) the strength is low. Furthermore, the specification of U.S. Pat. No. 4,031,165 discloses a polyester block copolymer comprising an aliphatic polyester and an aromatic polyester, but it is considered that, when the polymer is used in the form of a fiber, a problem of a low hydrolysis resistance arises. The specification of U.S. Pat. No. 3,446,778 discloses a polyester block copolymer comprising a hexamethylene terephthalate/isophthalate/aliphatic dicarboxylic acid copolyester and polymethylene terephthalate, which resembles the block copolymer of the present invention, but this block copolymer also has not been put to practical use. According to the disclosed process, the two polymers are bonded through a chain extender, and it is considered that, since the chain extender is included in the polymer chain, the hydrolysis resistance and elastic recovery are lowered.

Another reason why a practical use thereof is inhibited is that the elastic recovery and the resistance to agglutination at the molding or spinning step are contradictory requirements. Namely, if an attempt is made to obtain a product having a good elastic recovery, especially in the form of an fiber, an agglutination occurs and the yarn cannot be released.

As pointed out hereinbefore, a polyether, for example, polytetramethylene glycol, often used as the soft component, has a very poor oxidation resistance and low light resistance and chlorine resistance and the like, but these defects can be overcome by use of a stabilizer. Nevertheless, the use of a stabilizer leads to problems such as a discoloration by nitrogen oxide ($NO_x$) or a copper ion, and further, even if a stabilizer is used, a satisfactory light resistance or chlorine resistance cannot be obtained. In case of the spandex yarn, an aliphatic polyester is used as the soft component, for improving the chlorine resistance, but in this case, mildewing and hydrolysis occur. Therefore, if the problems of mildewing and hydrolysis can be solved, the application field of such a yarn will be broadened, and the durability thereof will be improved.

The conventional techniques and the problems thereof have been described above with regard to an elastic yarn as an example, but similar problems arise with a molded article and a film. The film, in particular, can be regarded as substantially equal to the fiber. In many cases, an elastic recovery performance is not required for a molded article, but since a stabilizer is used, problems such as a bleed-out of the stabilizer arise. Therefore, the development of an elastomer that can be used without the use of a stabilizer is desired.

SUMMARY OF THE INVENTION

A primary object of the present invention is to provide a block copolymer having a good elastic recovery, by using a soft component having an excellent oxidation resistance (light resistance, chlorine resistance or the like) and hydrolysis resistance.

Another object of the present invention is to provide an elastic yarn having a heat resistance such that it can withstand the temperatures generally adopted for a production of fabrics, and having a property such that an agglutination of filaments does not occur at such treatment temperatures.

When trying to select a polyester as a soft component having an excellent oxidation resistance for attaining the foregoing objects, since known aliphatic polyesters are very promptly hydrolyzed and cannot be practically used, the present inventors were forced to make an investigation into this matter, and as a result, found that an aromatic polyester could be used. This is advantageous in that characteristics at low temperatures, for example, below freezing point, are often unnecessary. Based on this finding, the investigation was repeated, and it was found that a polyester composed of a benzenedicarboxylic acid and a long-chain glycol could be used. A polyester was selected as a hard component for improving the poor wet heat resistance and poor yellowing resistance, i.e., the defects of the spandex. Also, methods of increasing the elastic recovery of this combination were investigated, and as a result it was found that, a block copolymer obtained by reaction between a specific polyester and another specific polyester can have a high elastic recovery and a high heat resistance, in the area where soft segments are increased.

In accordance with one aspect of the present invention, there is provided a polyester block copolymer having an inherent viscosity of at least 0.6, which comprises (A) 30 to 90% by weight of polyester segments comprising a benzenedicarboxylic acid as the main acid component and a diol having 5 to 12 carbon atoms between the hydroxyl groups as the main glycol component and (B) 70 to 10% by weight of polyester segments comprising an aromatic dicarboxylic acid as the main acid component and ethylene glycol, trimethylene glycol, tetramethylene glycol or 1,4-cyclohexane dimethanol as the main glycol component, wherein (i) when a polyester having an inherent viscosity of at least 0.6 is formed by polycondensation of the components constituting the polyester segments (A), the melting point of the obtained polyester is lower than 50° C. or the obtained polyester is amorphous, and (ii) when a polyester having an inherent viscosity of at least 0.6 is formed by polycondensation of the components constituting the polyester segments (B), the melting point of the polyester is higher than 180° C.

In accordance with another aspect of the present invention, there is provided an elastic yarn formed by using this polyester block copolymer.

DESCRIPTION OF THE PREFERRED EMBODIMENTS

The constituents of the polyester segments (A) of the present invention are an acid component composed mainly of a benzenedicarboxylic acid and a glycol component composed mainly of an aliphatic diol having 5 to 12 carbon atoms between the hydroxyl groups. The term "composed mainly of", as used herein, means that the content of the main acid or glycol component is "at least 70 mole %"; i.e., another component can be contained in an amount of up to 30 mole %. As the benzenedicarboxylic acid, there can be mentioned phthalic acid, isophthalic acid and terephthalic acid, but usually isophthalic acid is most frequently used. To control the crystallinity, isophthalic acid is often copolymerized with terephthalic acid or phthalic acid, and for this control, the terephthalic acid is used in an amount of up to 30 mole %.

As the aliphatic diol having 5 to 12 carbon atoms between the hydroxyl groups, there can be mentioned polymethylene glycol having 6 to 12 carbon atoms and a diol in which the hydrogen atom of the methylene chain of this polymethylene glycol is substituted by a methyl or ethyl group. For example, there can be used $HOCH_2CHCH_3(CH_2)_6OH$, $HOCH_2CH_2CHCH_3CH_2CH_2OH$ and $HOCH_2CH_2CH_2CHCH_3CH_2CH_2OH$.

The component to be copolymerized, other than the benzenedicarboxylic acids and the diols having 5 to 12 carbon atoms between the hydroxyl groups, is not particularly critical and various components can be copolymerized for improving various properties. For example, an aliphatic dicarboxylic acid or an aliphatic polyether can be copolymerized, to improve the elastic recovery at a low temperature, or to improve the dyeability with an ionic dye, a compound having a functional group having an affinity with the ionic dye can be copolymerized. As the aliphatic dicarboxylic acid, there can be mentioned, for example, an αω-dicarboxylic acid having 6 to 12 carbon atoms, and the amount copolymerized is generally up to 30 mole %, especially 10 to 30 mole %. At this copolymerization amount, any lowering of the hydrolysis resistance is insignificant, and the elastic recovery at temperatures close to 0° C. is greatly improved. As the polyether used for the same purpose, there can be mentioned polytetramethylene glycol. The amount incorporated of polytetramethylene glycol is preferably up to 30% by weight. If the amount is larger than this, a large quantity of a stabilizer must be used, as in the case of a polyether ester block copolymer, and thus the elastic recovery often becomes poor.

As the compound having a functional group having an affinity with an ionic dye, there can be used sulfonic acid salt compounds represented by the following formula for cationic dyes in amounts of 0.5 to 5 mole %, preferably 1 to 3 mole %, based on the dicarboxylic acid components constituting the entire polyester block copolymer:

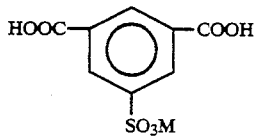

wherein M represents a metal or a quaternary phosphonium group.

As the metal M, Na, Li and K are preferred, and as the quaternary phosphonium group, a tetrabutyl phosphonium group, a butyltriphenyl phosphonium group and a tetraphenyl phosphonium group. More specifically, preferably 5-sodium sulfoisophthalic acid, 5-tetrabutyl phosphonium sulfoisophthalic acid and dimethyl esters thereof are used.

For anionic dyes, there can be used, for example, diol compounds having a quaternary phosphonium group, represented by the following formula, in amounts of 0.5 to 5 mole %, preferably 1 to 3 mole %:

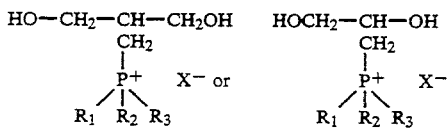

wherein $R_1$, $R_2$ and $R_3$ each represent a hydrocarbon group, preferably a butyl group or a phenyl group, $X^-$ represents a sulfonic acid anion, preferably a p-toluene-sulfonic acid anion or a methylsulfonic acid anion.

More specifically, the following compounds are preferably used:

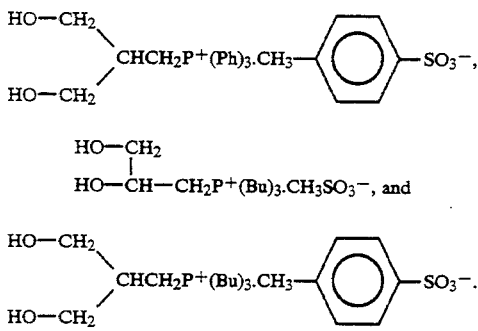

The above compound is preferably introduced in soft segments, but can be introduced only in hard segments or in both soft and hard segments.

The polyester (A') having an inherent viscosity of at least 0.6, which is obtained by polymerization of the components constituting the polyester segments (A), must have a melting point lower than 50° C. or be amorphous. If the melting point is higher than this level, a polymer having an intended elastic recovery cannot be obtained. In view of the elastic recovery, an amorphous polymer resembling a gum is especially preferred.

The polyester (A') is used in the form of a polyester having an inherent viscosity of at least 0.6, prepared according to customary preparation procedures. In view of the subsequent blocking reaction, the polyester is preferably synthesized in the presence of a titanium or tin catalyst. This is because, after the blocking reaction is carried out at a relatively low temperature not exceeding 260° C., the reaction can be stopped by phosphoric acid or the like. The inherent viscosity is preferably 0.8 to 1.3. If the inherent viscosity is too low, the strength of a molded article or yarn of the obtained elastomer, for example, an elastic yarn, is often reduced, and if the inherent viscosity is too high, the subsequent blocking reaction is not smoothly advanced. Note, the inherent viscosity referred to herein is determined at 35° C. in o-chlorophenol.

The polyester (B') having an inherent viscosity of at least 0.6, obtained by polycondensation of the components constituting the polyester segments (B), is prepared by customary procedures. Preferably, this polyester also is synthesized in the presence of a titanium or tin catalyst. The polyester (B') has an inherent viscosity of 0.6 to 1.5, preferably 0.8 to 1.3. The melting point of the polyester (B') is at least 180° C., preferably 200° to 260° C. More specifically, there can be mentioned polyesters of aromatic dicarboxylic acids such as terephthalic acid, naphthalene-2,6-dicarboxylic acid or 4,4'-diphenyldicarboxylic acid, and ethylene glycol, trimethylene glycol, tetramethylene glycol or cyclohexane dimethanol. Where the polyester block copolymer is used in the form of a fiber having a good elastic recovery, polytrimethylene terephthalate and polytetramethylene terephthalate are selected and used in preference to other aromatic polyesters, in view of the heat resistance and elastic recovery in the region where the quantity of the soft segments is at least 70%.

The polyester block copolymer of the present invention comprises the above-mentioned polyester segments (A) and polyester segments (B).

The weight ratio of the polyester segments (A) to the polyester segments (B) is from 30/70 to 90/10, preferably from 75/25 to 85/15. This polyester segment (A)/polyester segment (B) ratio can be determined based on the amount of the solid residue left when the polyester block copolymer in the form of a yarn having a single filament fineness of about 20 denier is treated in a 40% solution of methylamine in methanol at 40° C. for 8 hours at a concentration of 1 g/100 ml.

In the present invention, the polyester (A') and polyester (B') are subjected to an ester exchange reaction (blocking reaction). The weight ratio of the polyester (A') to the polyester (B') is adjusted to from 30/70 to 90/10, preferably from 50/50 to 85/15. If the proportion of the polyester (A') is below this range, the effects of the block copolymer are low. For example, the elastic recovery performance is unsatisfactory and the softness is poor. If the proportion of the polyester (A') exceeds the above-mentioned range, the crystallinity is poor and molding becomes difficult. When the block copolymer is used for a fiber, preferably the above-mentioned range is from 70/30 to 90/10, especially from 75/25 to 85/15. Outside the above range, a fiber having a satisfactory elastic recovery performance cannot be obtained.

In the present invention, the polyester (A') and polyester (B') are melt-reacted at the above-mentioned weight ratio. The degree of advance of this melting reaction is very important but cannot be simply determined. Nevertheless, the melting point of the formed polyester block copolymer must be lower by 2° to 40° C. than the melting point of the starting high-melting-point polyester (B'). Especially, in case of a fiber, the degree of advance of the melt reaction is preferably determined so that the elastic recovery after 200% stretching of the fiber is at least 85%, especially at least 90%, and agglutination does not occur during a heat treatment conducted at 130° C. These conditions depend on the polymer composition, inherent viscosities of the respective polyesters, the kind of the catalyst, the amount of the catalyst, the reaction temperature, and the reaction pressure, and accordingly, these factors are maintained at constant levels and the reaction time is changed, and a search is made for conditions giving a desired polymer. As another means, there can be mentioned a method in which the reaction is carried out in the absence of an agent opacifying the polymer, such as a delustering agent, and the point at which the polymer becomes transparent is used for determining the terminal point. This method is advantageous in that, even if reaction conditions vary, the corresponding terminal point of the reaction can be determined. In general, the reaction is stopped within 5 minutes from the point at which the polymer becomes transparent.

The blocking reaction can be performed either batchwise or in a continuous manner. For example, there can adopted a method in which the polyester (A') is formed by polymerization and when the inherent viscosity is elevated, the polyester (B') formed separately is added to the polyester (A') and reacted therewith, and a method in which the polyesters (A') and (B') are separately formed by polymerization and are supplied to a continuous reactor. The reaction is generally carried out at 230° to 260° C. under atmospheric pressure or a reduced pressure. If the temperature is too low, the polyester (B') is not easily dissolved and if the temperature is too high, it is difficult to stop the reaction, but where the reaction product can be immediately cooled, as in the continuous method, the reaction temperature can be further elevated. To control the reduction of the physical properties at the subsequent spinning step preferably, an acid such as phosphorus acid, phosphorous acid, phenyl phosphonic acid or phenyl phosphonous acid is added to stop the reaction. The acid is generally added in an amount of about 1 to about 10 moles per mole of the metal of the catalyst.

In accordance with another embodiment of the present invention, the obtained polyester block copolymer is spun into a fiber. The spinning process is not particularly critical, but in general, the melt spinning process is adopted. According to the melt spinning process, the polymer made molten by customary procedures is extruded from a spinneret, and the extrudate is cooled and taken out. If the ratio of the take-out speed to the extrusion speed is increased, the elongation is reduced. Accordingly, the take-out speed is appropriately determined depending on the intended use and the like. To control any deterioration caused by the blocking reaction, preferably the melting temperature is lower than 270° C., especially lower than 260° C.

In many cases the spun fiber is directly used, but in some cases, the spun fiber is heat-treated or drawn. The heat treatment temperature is generally 130° to 180° C., and drawing is generally carried out at room temperature to 70° C. A draw ratio of 3 to 6 is usually adopted.

Preferably, in the obtained elastic yarn, the elastic recovery after a 200% stretching is at least 90% and an agglutination of filaments does not occur even if a heat treatment is conducted at 130° C. for 10 minutes. In some cases, the elastic recovery is poor or agglutination occurs, which is due to the use of improper conditions for the production of the block copolymer. For example, if the reaction time is too long, the heat resistance is lowered and agglutination occurs in the yarn. If the reaction time is too short, the elastic recovery is poor and filaments of the yarn cannot be released. Furthermore, sometimes the ester exchange reaction is excessively advanced at the spinning step, and the same adverse results as observed when the reaction time is too long are obtained. Nevertheless, an intended fiber can be obtained if the foregoing factors are duly taken into consideration.

The polyester block copolymer of the present invention can be used not only for the above-mentioned elastic yarn but also for various products. For example, the polyester block copolymer is formed into a film and used for a packaging film or a liquid or blood transfusion vessel. Moreover, as the injection molding resin, the polyester block copolymer can be used for a shock absorber such as an automobile bumper, and for a soft bottle. In the field of extrusion molding, the polyester block copolymer can be used for molding a tube and an electric wire coating, and the like. When the polyester block copolymer of the present invention is applied in these fields, a superior photostability is obtained, bleed-out does not occur because a stabilizer is not incorporated, the surface does not become fogged, little mildewing is caused, biological damage is reduced, and an excellent sanitary effect is attained. According to the present invention, there can be obtained an elastic yarn having an elastic recovery performance comparable to that of the known elastic yarn, such as a spandex yarn, and superior photostability and chlorine resistance than those of the known elastic yarn. Even if a stabilizer is not used, the elastic yarn of the present invention has an excellent photostability, and accordingly, the elastic yarn is advantageous in that attention need not be paid to a prevention of a dropping out of the stabilizer at the dyeing step or the washing step (especially the dry-cleaning step).

Especially, where polytrimethylene terephthalate or polytetramethylene terephthalate is used for the hard segments, even if the amount of the soft segments is increased beyond 70% by weight, an elastic yarn having no stickiness and a high elastic recovery can be obtained. This is most surprising, and it is considered that this effect is due to the specific combination of the polyester segments.

The present invention is characterized in that a polyester block copolymer easily dyeable with an ionic dye can be easily obtained. Namely, since a compound having a functional group having an affinity with an ionic dye can be selectively introduced into soft segments, reduction of the crystallinity or melting point in hard segments can be controlled and a lowering of the heat resistance can be prevented.

Additives such as a pigment, a dye, a stabilizer, a filler, a modifier, a release agent and a flame retardant can be incorporated into the polyester block copolymer of the present invention. The elastic yarn can be used directly or when covered with another nylon or polyester fiber.

The present invention will now be described in detail with reference to the following examples. In the examples, all of "parts" are by weight.

EXAMPLE 1

A mixture of 70 parts of dimethyl isophthalate, 12 parts of dimethyl terephthalate, 40 parts of decanedicarboxylic acid and 150 parts of hexamethylene glycol was heated together with 0.07 part of titanium tetrabutoxide, and methanol and water formed as by-products were removed. Then, the reaction product was transferred into a reaction vessel wherein a reduction of the pressure was possible, and a reaction was conducted under a reduced pressure to obtain a polyester (A') having an inherent viscosity of 0.95. Separately, polytetramethylene terephthalate having an inherent viscosity of 0.92 [polyester (B')] was prepared from dimethyl terephthalate and tetramethylene glycol by conducting the polymerization in the same manner as described above. The polyester (B') was added to the polyester (A') so that the amount of the polyester (A') was 80% by weight and the amount of the polyester (B') was 20% by weight. The mixture was reacted at 250° C. for 15 minutes under a reduced pressure of 1 mmHg. Primarily, the reaction mixture was opaque but became transparent when the reaction was conducted for about 12 minutes. After 15 minutes, 0.1 part of phosphoric acid was added to the reaction mixture, the reaction mixture was stirred for 5 minutes, and the product was recovered to obtain a polyester block copolymer having an inherent viscosity of 0.96.

The obtained polyester block copolymer was extruded from a spinneret having 12 holes at 250° C., the extrudate was wound up at a speed of 400 m/min to obtain an elastic yarn having an elongation of 720% and a strength of 0.8 g/de, and the elastic recovery ratio of the elastic yarn was 93% as measured when the elastic yarn was recovered immediately after the elastic yarn was elongated by 200% (to a length 3 times the original length). When the elastic yarn was immersed in an aqueous solution of sodium hypochlorite having a chlorine concentration of 600 ppm and a pH value of 7 at 60° C. for 2 hours, the strength was not noticeably reduced. When the elastic yarn was irradiated by a xenon tester at 60° C. for 144 hours, little discoloration occurred and the strength retention ratio was higher than 80%. The elastic yarn was maintained in tetrachloroethylene at 50° C. for 1 hour and dried, and the yarn was irradiated for 24 hours by a xenon tester in the same manner as described above. The strength retention ratio after the irradiation was 94%. Furthermore, when the elastic yarn was treated in hot water at 130° C. for 1 hour, the strength retention ratio was 61%.

EXAMPLE 2

A mixture of 70 parts of dimethyl isophthalate, 12 parts of dimethyl terephthalate, 34 parts of azelaic acid and 150 parts of decamethylene glycol was heated together with 0.02 part of dibutyl tin diacetate, and methanol and water formed as by-products were removed. Then, the reaction product was transferred into a reaction vessel wherein a reduction of the pressure was possible, and a reaction was conducted under a reduced pressure to obtain a polyester (A') having an inherent viscosity of 0.98. Separately, polytetramethylene terephthalate having an inherent viscosity of 0.92 [polyester (B')] was prepared from dimethyl terephthalate and tetramethylene glycol by conducting the polymerization in the same manner as described above. The polyester (B') was added to the polyester (A') such that the amount of the polyester (A') was 85% by weight and the amount of the polyester (B') was 15% by weight. The mixture was reacted at 250° C. for 10 minutes under a reduced pressure of 1 mmHg. Primarily, the reaction mixture was opaque but became transparent when the reaction was conducted for about 8 minutes. After 10 minutes, 0.1 part of phosphoric acid was added to the reaction mixture, the reaction mixture was stirred for 5 minutes, and the product was recovered to obtain a polyester block copolymer having an inherent viscosity of 0.92.

The obtained polyester block copolymer was extruded from a spinneret having 12 holes at 250° C., the extrudate was wound up at a speed of 400 m/min to obtain an elastic yarn having an elongation of 690% and a strength of 0.6 g/de, and the elastic recovery ratio of the elastic yarn was 95% as measured when the elastic yarn was recovered immediately after the elastic yarn was elongated by 200% (to a length 3 times the original length). When the elastic yarn was immersed in an aqueous solution of sodium hypochlorite having a chlorine concentration of 600 ppm and a pH value of 7 at 60° C. for 2 hours, the strength was little reduced. When the elastic yarn was irradiated by a xenon tester at 60° C. for 144 hours, little discoloration occurred and the strength retention ratio was higher than 80%.

Comparative Example 1

A polyester block copolymer was prepared in the same manner as described in Example 1 except that a polyester having an inherent viscosity of 1.04, obtained by polymerization of decane-dicarboxylic acid and hexamethylene glycol in the presence of titanium tetrabutoxide as the polymerization catalyst, was used as the polyester (A').

When the block copolymer was spun in the same manner as described in Example 1, in the obtained yarn, filaments were agglutinated to one another and the yarn product could not be released from a bobbin. When the wound body was heat-treated in a hot air drier at 130° C. for 10 minutes, a fusion bonding of the filaments occurred.

When the yarn was treated in hot water at 130° C. for 1 hour, the yarn became very weak.

From the foregoing results it is seen that, if the above-mentioned aliphatic polyester was used as the polyester (A'), (1) the obtained block copolymer was very sticky and had a poor heat resistance, and (2) the hydrolysis resistance was very low.

Examples 3 through 8 and Comparative Example 2

A mixture of 70 parts of dimethyl isophthalate, 12 parts of dimethyl terephthalate, 40 parts of dimethyl sebacate and 150 parts of decamethylene glycol was heated together with 0.02 part of dibutyl tin diacetate, and methanol and water formed as by-products were removed. Then, the reaction product was transferred into a reaction vessel wherein a reduction of the pressure was possible, and a reaction was conducted under a reduced pressure to obtain a polyester (A') having an inherent viscosity of 0.96. Separately, polytetramethylene terephthalate having an inherent viscosity of 0.92 [polyester (B')] was prepared from dimethyl terephthalate and tetramethylene glycol by conducting the polymerization in the same manner as described above. The polyester (B') was added to the polyester (A') and they were reacted at various ratios. Then, in the same manner as described in Example 1, phosphoric acid was added, and spinning was carried out. The results are shown in the following table.

| Example No. | Polyester (A')/ Polyester (B') | Inherent Viscosity of Polyester Block Copolymer | Elastic Recovery Ratio (after 200% elongation) | Heat Resistance |
| --- | --- | --- | --- | --- |
| 3 | 65/35 | 0.96 | 74% | good |
| 4 | 70/30 | 0.95 | 85% | good |
| 5 | 75/25 | 0.96 | 89% | good |
| 6 | 80/20 | 0.95 | 92% | good |
| 7 | 85/15 | 0.95 | 94% | good |
| 8 | 90/10 | 0.96 | 95% | slight agglutination |
| Comparative Example 2 | 95/5 | 0.96 | spinning impossible | — |

From the results of Comparative Example 2 it is seen that, if the amount of the polyester (B') was too small, the heat resistance was low and the moldability or spinnability was poor.

EXAMPLE 9

A polyester block copolymer was prepared in the same manner as described in Example 1 except that polytrimethylene terephthalate (having an inherent viscosity of 0.80) similarly formed by polymerization was used instead of polytetramethylene terephthalate. The elastic recovery ratio (after 200% elongation) of the yarn obtained by spinning this block copolymer was 91%. When the yarn was treated at 130° C. for 10 minutes, agglutination did not occur in the yarn.

EXAMPLE 10

Synthesis of a polyester block copolymer was tried in the same manner as described in Example 1 by using polytetramethylene-2,6-naphthalene-dicarboxylate instead of polytetramethylene terephthalate. Various reaction times were adopted, and the heat resistance and the elastic recovery were examined. The results are shown in the following table.

| Reaction Time (minutes) | State of Polymer | Elastic Recovery Ratio (after 200% elongation) | Heat Resistance (fusion bonding at 130° C.) |
| --- | --- | --- | --- |
| 10 | opaque | 65% | good |
| 15 | transparent | 75% | slight agglutination |
| 20 | transparent | 81% | agglutination |

It is seen that, compared with the case where polytetramethylene terephthalate was used, when polytetramethylene-2,6-naphthalene-dicarboxylate was used, the range of conditions giving optimum results was relatively narrow and the physical properties were relatively poor, but the formation of an elastic yarn was possible.

EXAMPLE 11

Dimethyl isophthalate, 1,12-dodecane-diol and ethylene glycol were subjected to ester exchange reaction in the presence of titanium tetrabutoxide (40 millimole % based on dimethyl isophthalate) as the catalyst, and polymerization was carried out under a high vacuum according to customary procedures to obtain a polyester (A') having an inherent viscosity of 1.10. The obtained polyester was hydrolyzed and the copolymerization ratio of the glycol components was measured by the gas chromatography. It was found that 1,12-dodecane-diol/ethylene glycol molar ratio was 81/19.

Then, 35 parts by weight of the same polyester (B') as used in Example 1 was melted at 250° C. and 65 parts by weight of the above polyester (A') was added thereto, and stirring reaction was carried out at 250° C. for 1 hour and 40 minutes under a reduced pressure lower than 1 mmHg. When the reaction mixture became slightly transparent, phosphoric acid was added in an amount of 1.5 moles per mole of titanium.

The inherent viscosity of the obtained block copolymer was 1.12 and the melting point was 195° C. (the measurement was conducted at a temperature-elevating rate of 20° C./minute by using a differential scanning calorimeter and the endothermic peak temperature was determined). The block copolymer was extruded at 250° C. from a nozzle hole having a diameter of 0.5 mm, and the extrudate was wound up at a speed of 200 m/min to obtain a fiber. When the fiber was elongated by 50% at 25° C. and immediately recovered, the recovery ratio (measured after 1 minute; elastic recovery ratio after 50% elongation) was higher than 95%. When the fiber was maintained in a hot air drier at 120° C. for 15 days, the elastic recovery ratio after 50% elongation was higher than 95%. Thus, it was confirmed that the fiber had a very high durability.

Comparative Example 3

A polyether ester block copolymer having a polytetramethylene glycol component content of 65% by weight was prepared from polytetramethylene glycol having an average molecular weight of 2,000, dimethyl terephthalate and tetramethylene glycol according to customary procedures. This polymer had an inherent viscosity of 1.35 and a melting point of 189° C.

The obtained polymer was formed into a fiber in the same manner as described in Example 1. When the elastic recovery ratio after 50% elongation was measured, the elastic recovery ratio was higher than 95% and was good. If the fiber was maintained in a hot air drier at 120° C., however, the fiber was deteriorated and crumbled within about 1 week. Thus, it was confirmed that the polyether ester block copolymer had a very poor oxidation resistance.

Example 12 through 22 and Comparative Example 4

Polyester (A') and polyester (B') shown in the following table, prepared by using titanium tetrabutoxide (40 millimole % based on the total dicarboxylic acid components), were melt-mixed under conditions shown in the table. In the same manner as described in Example 1, when the reaction mixture became slightly transparent, phosphoric acid was added to the reaction mixture to obtain a polyester block copolymer.

The characteristics of the obtained polymer were evaluated in the same manner as described in Example 11. The results are shown in the following table.

cosity of 1.05. When the obtained polyester was hydrolyzed and the copolymerization ratio of the glycol components was measured by the gas chromatography, it

|  |  | Example 12 | Example 13 | Example 14 | Example 15 | Example 16 | Example 17 |
|---|---|---|---|---|---|---|---|
| Polyester (A') | dicarboxylic acid component/ diol component | DMI/ $C_{12}G$ | DMI/ $C_{12}G$/ $C_2G$ (81/19) | DMI/ $C_{12}G$/ $C_2G$ (81/19) | DMI/ $C_{12}G$/ $C_2G$ (81/19) | DMI/ $C_{12}G$/ $C_2G$ (81/19) | DMP/DMI (1/1)/ $C_{12}G$ |
|  | polymerization conditions | 260° C., reduced pressure | 260° C., reduced pressure | 260° C., reduced pressure | 260° C., reduced pressure | 260° C., reduced pressure | 260° C., reduced pressure |
|  | inherent viscosity | 1.06 | 1.10 | 1.10 | 1.10 | 1.10 | 0.94 |
| Polyester (B') | dicarboxylic acid component/ diol component | DMT/ $C_4G$ | DMT/ $C_2G$ | DMT/CHDM/ $C_2G$ (10/90) | DMN/ $C_4G$ | DMT/DMD (90/10)/ $C_4G$ | DMT/ $C_4G$ |
|  | polymerization conditions | 250° C., reduced pressure | 285° C., reduced pressure | 300° C., reduced pressure | 260° C., reduced pressure | 260° C., reduced pressure | 250° C., reduced pressure |
|  | inherent viscosity | 0.91 | 0.63 | 0.69 | 0.73 | 0.79 | 0.91 |
|  | melting point (°C.) | 225 | 265 | 247 | 241 | 207 | 225 |
| Melt Mixing | A'/B' (weight ratio) | 65/35 | 65/35 | 65/35 | 65/35 | 65/35 | 65/35 |
|  | mixing conditions | 250° C., high vacuum | 285° C., high vacuum | 300° C., high vacuum | 260° C., high vacuum | 260° C., high vacuum | 250° C., high vacuum |
| Physical Properties | inherent viscosity | 1.10 | 0.93 | 0.97 | 1.22 | 0.96 | 1.16 |
|  | melting point (°C.) | 200 | 241 | 223 | 232 | 186 | 191 |
|  | recovery ratio (%) after 50% elongation | >95 | >95 | >95 | >95 | >95 | >95 |
|  | recovery ratio (%) after 15 days | >95 | >95 | >95 | >95 | >95 | >95 |

|  |  | Example 18 | Example 19 | Example 20 | Example 21 | Comparative Example 4 | Example 22 |
|---|---|---|---|---|---|---|---|
| Polyester (A') | dicarboxylic acid component/ diol component | DMP/ $C_{12}G$ | DMI/ $C_8G$ | DMI/ $C_6G$ | DMI/ $C_{12}G$/ $C_2G$ (81/19) | DMI/ $C_4G$ | DMI/MOD |
|  | polymerization conditions | 260° C., reduced pressure | 260° C., reduced pressure | 260° C., reduced pressure | 260° C., reduced pressure | 250° C., reduced pressure | 260° C., reduced pressure |
|  | inherent viscosity | 0.82 | 1.12 | 1.13 | 1.10 | 1.15 | 0.95 |
| Polyester (B') | dicarboxylic acid component/ diol component | DMT/ $C_4G$ | DMT/ $C_4G$ | DMT/ $C_4G$ | DMT/ $C_4G$ | DMT/ $C_4G$ | DMT/ $C_4G$ |
|  | polymerization conditions | 250° C., reduced pressure | 250° C., reduced pressure | 250° C., reduced pressure | 250° C., reduced pressure | 250° C., reduced pressure | 250° C., reduced pressure |
|  | inherent viscosity | 0.91 | 0.91 | 0.91 | 0.91 | 0.91 | 0.91 |
|  | melting point (°C.) | 225 | 225 | 225 | 225 | 225 | 225 |
| Melt Mixing | A'/B' (weight ratio) | 65/35 | 65/35 | 65/35 | 45/55 | 65/35 | 65/35 |
|  | mixing conditions | 250° C., high vacuum | 250° C., high vacuum | 250° C., high vacuum | 250° C., high vacuum | 250° C., high vacuum | 250° C., high vacuum |
| Physical Properties | inherent viscosity | 1.12 | 1.23 | 1.25 | 1.21 | 1.27 | 0.96 |
|  | melting point (°C.) | 192 | 203 | 207 | 212 | 205 | 199 |
|  | recovery ratio (%) after 50% elongation | >95 | >95 | 93 | 81 | 32 | >95 |
|  | recovery ratio (%) after 15 days | >95 | >95 | 93 | 81 | 31 | >95 |

Note
DMI: dimethyl isophthalate
DMP: dimethyl phthalate
$C_nG$: n-alkane-diol having n of carbon atoms
DMT: dimethyl terephthalate
DMN: dimethyl 2,6-naphthalene-dicarboxylate
DMD: dimethyl 4,4'-diphenyldicarboxylate
CHDM: 1,4-cyclohexane-dimethanol
MOD: 2-methyl-1,8-octane-diol

EXAMPLE 23

Dimethyl isophthalate and 5-tetrabutyl phosphonium sulfoisophthalic acid dimethyl ester (4 mole % based on dimethyl isophthalate) were subjected to an ester exchange reaction with 1,10-decane-diol and ethylene glycol in the presence of titanium tetrabutoxide (40 millimole % based on dimethyl isophthalate) as the catalyst, and polymerization was carried out at 260° C. under a high vacuum according to customary procedures to obtain a polyester (A') having an inherent viscosity of 1.05. When the obtained polyester was hydrolyzed and the copolymerization ratio of the glycol components was measured by the gas chromatography, it was found that the 1,10-decane-diol/ethylene glycol molar ratio was 81/19.

Then, 35 parts by weight of the same polyester (B') as used in Example 1 was melted at 250° C. and 65 parts of the above polyester (A') was added to the melt, and a stirring reaction was carried out at 250° C. for 40 minutes under a high vacuum of less than 1 mmHg. When the reaction mixture became slightly transparent, phosphorous acid was added to the reaction mixture in an amount of 1.5 moles per mole of titanium.

The inherent viscosity of the obtained polyester block copolymer was 1.10 and the melting point was 193° C. (the measurement was conducted at a temperature-elevating rate of 20° C./min by using a differential scanning calorimeter and the endothermic peak temperature was determined).

This polymer was dried and melted at 260° C., and the melt was extruded from a cap having a three-hole nozzle at an extrusion rate of 3.9 g/min. The extrudate was wound up at a speed of 1500 m/min through two godet rolls to obtain an elastic yarn. The physical properties of the elastic yarn are shown in the following table. The elastic yarn was maintained in a hot air drier at 120° C. for 15 days, and then the recovery ratio after 50% elongation was measured. The results are shown in the following table. It is seen that the elastic yarn had an excellent heat resistance. The elastic fiber was dyed at 120° C. for 60 minutes with a dyeing solution containing 2% owf of a cationic dye (Cathilon Blue CD-FRLH/Cathilon Blue CD-FBLH 1/1; supplied by Hodogaya Kagaku) (further containing 3 g/l of Glauber salt and 0.3 g/l of acetic acid). The clarity of the dyed fabric is shown in the following table.

| inherent viscosity | 1.10 |
|---|---|
| melting point (°C.) | 198 |
| strength (g/de) | 1.10 |
| elongation (%) | 625 |
| recovery ratio (%) after 50% stretching | >95 |
| Recovery ratio (%) after 50% stretching after 15 days | >95 |
| clarity of dyed fabric | clear dense blue color |

EXAMPLE 24

Dimethyl isophthalate and a compound of the following formula (a) (5 mole % based on dimethyl

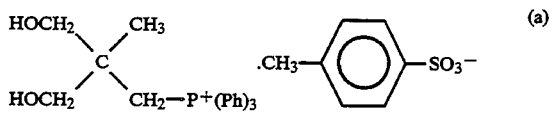

were subjected to ester exchange reaction with 1,10-decane-diol and ethylene glycol in the presence of titanium tetrabutoxide as the catalyst, and polymerization was carried out at 260° C. under a high vacuum according to customary procedures to obtain a polyester (A') having an inherent viscosity of 1.02. When the obtained polyester was hydrolyzed and the copolymerization ratio of the glycol components was measured by the gas chromatography, it was found that the 1,10-decanediol/diethylene glycol molar ratio was 86/14.

Then, 35 parts by weight of the same polyester (B') as used in Example 1 was melted at 250° C., and 65 parts by weight of the above polyester (A') was added to the melt and stirring reaction was carried out at 250° C. under a high vacuum of less than 1 mmHg for 40 minutes. When the reaction mixture became slightly transparent, phosphorous acid (1.5 moles per mole of titanium) was added to the reaction mixture.

The inherent viscosity of the obtained polyester block copolymer was 1.08, and the melting point was 191° C. (the endothermic peak temperature was determined at a temperature-elevating rate of 20° C./minute by a differential scanning calorimeter).

The polymer was evaluated in the same manner as described in Example 23. The results are shown in the following table. From the shown results, it is seen that the elastic performances of the obtained block copolymer were excellent.

The elastic yarn was formed into a cylindrical knitted fabric, and the fabric was dyed at 120° C. for 60 minutes in a dyeing solution containing 2% owf of an acidic dye, Alizarin Light Blue AA (pH value was 3, acetic acid was contained in an amount of 3 ml/l and the bath ratio was 1/50). The fabric was dyed to a very clear dense blue color.

| inherent viscosity | 1.08 |
|---|---|
| melting point (°C.) | 191 |
| strength (g/de) | 1.06 |
| elongation (%) | 610 |
| recovery ratio (%) after 50% stretching | >95 |
| Recovery ratio (%) after 50% stretching after 15 days | >95 |
| clarity of dyed fabric | clear dense blue color |

We claim:

1. A polyester block copolymer having an inherent viscosity of at least 0.6, which comprises (A) 30 to 90% by weight of polyester segments comprised of at least 70 mols percent of benzenedicarboxylic acid as the main acid component and a diol having 5 to 12 carbon atoms between the hydroxyl groups as the main glycol component and (B) 70 to 10% by weight of polyester segments comprising an aromatic dicarboxylic acid as the main acid component and ethylene glycol, trimethylene glycol, tetramethylene glycol or 1,4-cyclohexane dimethanol as the main glycol component, wherein (i) when a polyester having an inherent viscosity of at least 0.6 is formed by polycondensation of the components constituting the polyester segments (A), the melting point of the obtained polyester is lower than 50° C. or the obtained polyester is amorphous, and (ii) when a polyester having an inherent viscosity of at least 0.6 is formed by polycondensation of the components constituting the polyester segments (B), the melting point of the polyester is higher than 180° C.

2. A polyester block copolymer as set forth in claim 1, wherein the compound to be copolymerized is selected from 5-sodium sulfoisophthalic acid, 5-tetrabutyl phosphonium sulfoisophthalic acid and dimethyl esters thereof.

3. A polyester block copolymer as set forth in claim 1, wherein the compound to be copolymerized is selected from

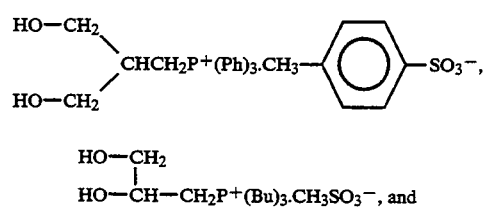

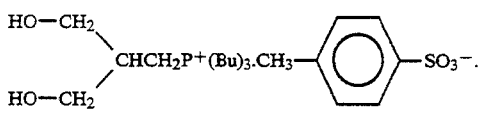

4. A polyester block copolymer as set forth in claim 1, which is a polyester block copolymer obtained by melt-mixing 30 to 90% by weight of a polyester (A′) which has an intrinsic viscosity of 0.6 to 1.5 and has a melting point lower than 50° C. or is amorphous and comprises a benzenedicarboxylic acid as the main acid component and an aliphatic diol having 5 to 12 carbon atoms between the hydroxyl groups as the main glycol component, with 70 to 10% by weight of a high-melting-point polyester (B′) having a melting point higher than 180° C. and an inherent viscosity of 0.6 to 1.5 and comprising an aromatic dicarboxylic acid as the main acid component and ethylene glycol, trimethylene glycol, tetramethylene glycol or 1,4-cyclohexane dimethanol as the main glycol component, to effect ester exchange reaction, and the melting point of the block copolymer is lower by 2 to 40° C. than the melting point of the polyester (B′).

5. A polyester block copolymer as set forth in claim 4, wherein the amount of the polyester (A′) employed is 50 to 85% by weight and the amount of the polyester (B′) employed is 50 to 15% by weight.

6. An elastic yarn composed of a polyester block copolymer as set forth in claim 1.

7. An elastic yarn as set forth in claim 6, wherein the polyester block copolymer is a polyester block copolymer obtained by melt-mixing 70 to 90% by weight of a polyester (A′) which has an intrinsic viscosity of 0.6 to 1.5 and has a melting point lower than 50° C. or is amorphous and comprises a benzenedicarboxylic acid as the main acid component and an aliphatic diol having 5 to 12 carbon atoms between the hydroxyl groups as the main glycol component, with 30 to 10% by weight of a polyester (B′) having a melting point higher than 180° C. and an inherent viscosity of 0.6 to 1.5 and comprising terephthalic acid as the main acid component and ethylene glycol trimethylene glycol or tetramethylene glycol as the main glycol component, to effect ester exchange reaction, the melting point of the block copolymer is lower by 2° to 40° C. than the melting point of the polyester (B′), the elastic recovery ratio after 200% stretching of the elastic yarn is at least 90%, and when the elastic yarn is heat-treated at 130° C. for 10 minutes, agglutination does not occur in the elastic yarn.

8. An elastic yarn as set forth in claim 7, wherein the amount of the polyester (A′) employed is 75 to 85% by weight and the amount of the polyester (B′) employed is 25 to 15% by weight.

9. A polyester block copolymer having an inherent viscosity of at least 0.6, which comprises (a) 30 to 90% by weight of polyester segments comprising a benzenedicarboxylic acid as the main acid component and an aliphatic diol having 5 to 12 carbon atoms between the hydroxyl groups as the main glycol component and (B) 70 to 10% by weight of polyester segments comprising an aromatic dicarboxylic acid as the main acid component and ethylene glycol, trimethylene glycol, tetramethylene glycol or 1,4-cyclohexane dimethanol as the main glycol component, wherein (i) when a polyester having an inherent viscosity of at least 0.6 is formed by polycondensation of the components constituting the polyester segments (A), the melting point of the obtained polyester is lower than 50° C. or the obtained polyester is amorphous, and (ii) when a polyester having an inherent viscosity of at least 0.6 is formed by polycondensation of the components constituting the polyester segments (B), the melting point of the polyester is higher than 180° C., and wherein at least one member selected from the group consisting of compounds represented by the following formulae is copolymerized in an amount of 0.1 to 5 mole % based on the total acid components constituting the polyester block copolymers:

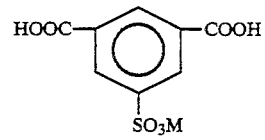

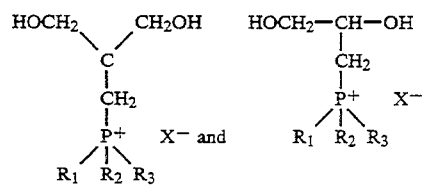

wherein M represents an alkali metal or $PR_1R_2R_3R_4$, $R_1$, $R_2$, $R_3$ and $R_4$, which may be the same or different, represent a hydrocarbon group having 1 to 8 carbon atoms, and $X^-$ represents a sulfonic acid anion.

10. A knitted fabric comprised of the elastic yarn of claim 6.

11. A knitted fabric comprised of the elastic yarn of claim 7.

* * * * *